Feb. 11, 1969   M. ARENDARSKI   3,426,651
AIR-OIL SUSPENSION

Filed July 26, 1966   Sheet 1 of 2

INVENTOR.
MARION ARENDARSKI
BY
Stephen M. Mihaly
ATTORNEY 3,426,651
AIR-OIL SUSPENSION
Marion Arendarski, Kalamazo, Mich., assignor to Pneumo Dynamics Corporation, Cleveland, Ohio, a corporation of Delaware
Filed July 26, 1966, Ser. No. 568,050
U.S. Cl. 92—26           1 Claim
Int. Cl. F15b 15/26; F01b 7/20; F16d 57/00

ABSTRACT OF THE DISCLOSURE

A suspension for a wheel assembly and the like having a shock cylinder and piston rod forming a variable volume air-oil chamber, with a rod having an intermediate enlarged section sealed to the cylinder and an internal bypass for displacement of the oil from one side of the enlargement to the other through a spool valve which operates to control the flow in both directions and provide positive damping for shock and rebound loads. The shock cylinder is supported reciprocably in a retraction cylinder which operates to extend and retract the shock cylinder hydraulically, and the two cylinders have cooperating locking devices for mechanically locking the shock cylinder in its fully extended condition, the locking members including spring lock fingers which bear against and enter a relief in the wall of the shock cylinder when the latter is extended and a finger lock sleeve carried by the head of the shock cylinder to engage about the fingers in this condition, the locking sleeve being moved hydraulically from such position when the shock cylinder is to be retracted to free the same.

---

This invention relates to a suspension for wheel assemblies and the like and has for a primary object the provision of an improved suspension on this order having actuator and shock absorber sections in combination.

The shock absorber section of the new suspension of course provides shock dampening for a wheel assembly carried thereby and the actuator is combined therewith for relative extension and retraction of the shock absorber section and hence the wheel assembly. The design is such that the shock absorber section is independent of the actuator in the sense that it will function to dampen shock on the wheel assembly in both the extended and retracted positions.

It is also an object of this invention to provide such a suspension in which the actuator is hydraulically operated and the shock absorber section becomes automatically locked upon full extension thereof. A related further object is to provide mechanical locking of the sections in such condition, so that the hydraulic pressure is not required to maintain the condition, for example, where the extension is effective to lower the associated wheel assembly and becomes locked in the down condition. It is a still further object to provide for hydraulic unlocking of the mechanically locked sections.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1a is a fragmentary view on an enlarged scale and in comparable section of the damping valve assembly used in the suspension.

Figure 1:
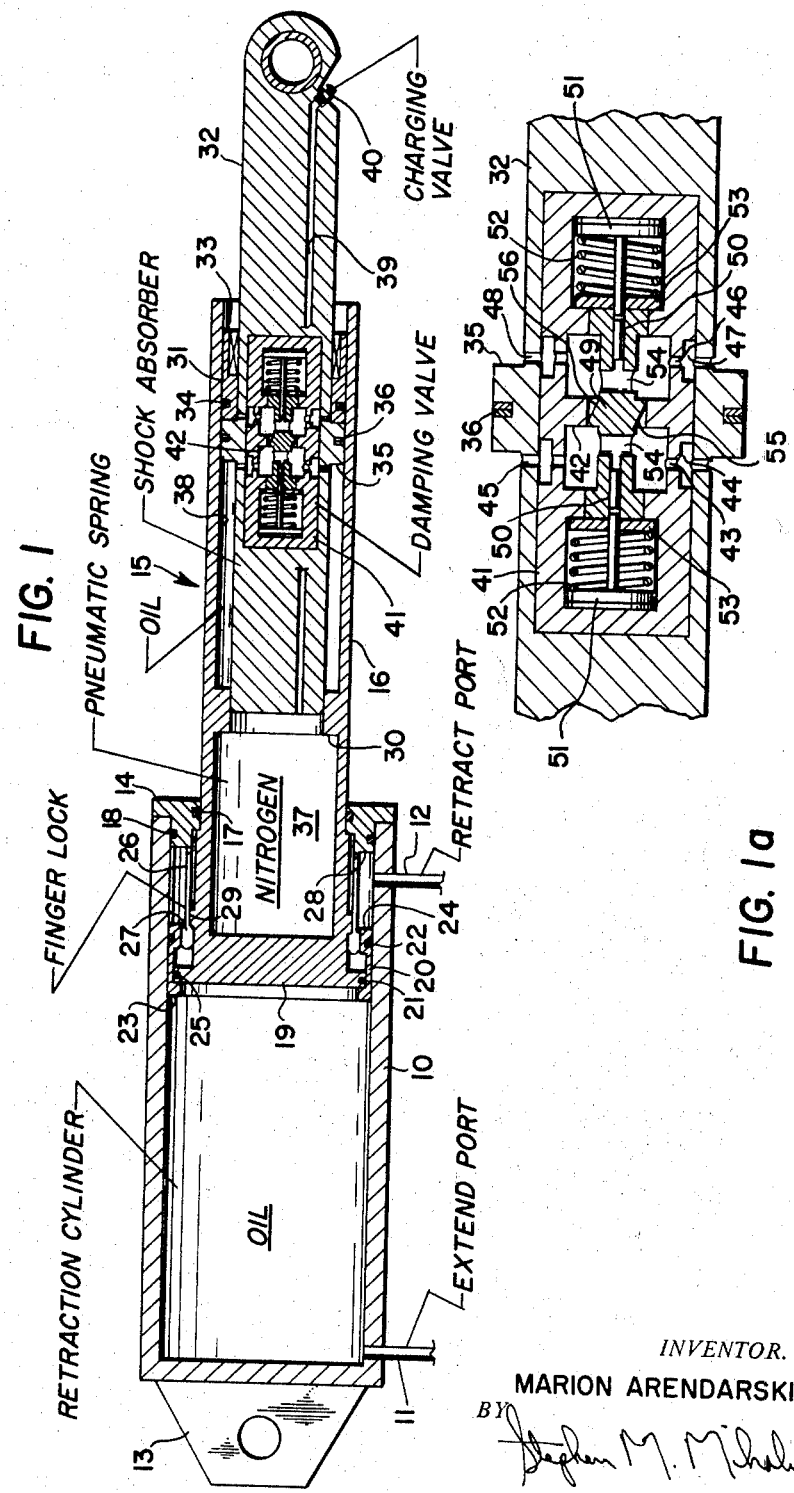
FIG. 1 is a partially schematic longitudinal section of an air-oil suspension in accordance with the present invention.

Referring now to the drawings in detail, the major components of the new suspension are indicated by the legends in FIG. 1 as comprising a retraction cylinder 10 containing oil and having extend and retract ports 11 and 12, respectively, adjacent its ends for flow of the oil or other hydraulic fluid under pressure to and from the cylinder. An apertured mounting lug 13 is shown at the closed end of the cylinder for mounting on structure, not shown, to be supported by the suspension, and the other end of the cylinder is closed by a ring 14.

Retraction cylinder 10 forms the hydraulic actuator section of the suspension and the shock absorber section designated generally by reference numeral 15 comprises a shock cylinder 16 extending through the ring 14 into the retraction cylinder. This ring 14 carries inner and outer peripheral packings 17 and 18 for sealing respectively with the shock cylinder and the end of the retraction cylinder. The shock cylinder 16 has a head 19 at its end within the retraction cylinder of somewhat smaller diameter than the inside diameter of the latter and this head is surrounded by a sleeve 20 which can experience a limited degree of movement relative to the head. The head will be seen to be sealed by a packing 21 to the inner wall of the sleeve 20, while the outer sleeve wall carries a packing 22 in sealing engagement with the inner wall of the retraction cylinder 10. Radial flanges 23 and 24 are formed at the respective ends of the sleeve 20, with the intervening length thereof being greater than the thickness of the head 19 as shown to provide the indicated relative movement. In this embodiment, there is a spring 25 between the head 19 and the outer sleeve flange 24 effective resiliently to hold the sleeve in the illustrated condition relative to the head.

The ring 14 closing the end of the retraction cylinder 10 through which the shock cylinder 16 extends is provided with a finger lock 26 directed inwardly parallel to the axis and comprising a plurality of spring fingers the ends 27 of which are enlarged as shown to provide heads which are generally rectangular in radial section with beveled corners. The end section of the shock cylinder 16 adjacent the head 19 is of relatively enlarged outer diameter with a resulting stop shoulder 28 which engages the actuator closure ring 14 to limit the extension of the shock absorber, the assembly being illustrated in the fully extended condition of adjustment. The shock cylinder end section is further formed with a peripheral cylindrical boss 29 the inner end of which is beveled approximately at the same angle as the corners of the locking finger heads 27.

It will be apparent that the shock cylinder 16 is mechanically locked in the fully extended condition illustrated in FIG. 1 by the engagement of the heads 27 of the fingers by the sleeve flange 24 at the radially outer sides of the heads and the wall of the shock cylinder against the boss 29. The shock cylinder has of course been extended or moved to this condition by supplying the hydraulic fluid under pressure to the cylinder 10 through the extend port 11 with the retract port 12 open to the reservoir. The finger lock 26 is normally free flexibly to expand in the clearance provided about the wall of the shock cylinder and the surrounding wall of the retraction cylinder as the shock cylinder moves outwardly. The fingers of this lock thus can flex outwardly to pass the shoulder 28 if the same is not normally cleared and also the boss 29 in the approach to full extension. However, the sleeve 20 moveable with the head 19 moves into the enclosing and hence restraining engagement with the heads 27 of the fingers when the latter move inwardly against the wall of the shock cylinder and the inner side of the boss 29.

The thus locked suspension is unlocked by applying hydraulic pressure to the retract port, a predetermined differential pressure between the extend and retract ports being sufficient to move the head and ring from the restraining engagement with the fingers, and the suspension can only be unlocked in this manner. It will also be appreciated that the mechanical locking action provided eliminates any need to rely on the hydraulic pressure to maintain the shock absorber section in its down or fully extended position and it will of course be understood that in the wheel assembly used, the wheel is mounted on the remote or free end of the shock absorber section.

The shock cylinder 16 has an intermediate annular wall 30 and a sealed bearing assembly 31 adjacent its open outer end. A piston rod assembly 32 is supported for reciprocation in the bearing assembly, the latter comprising a sleeve bearing 33 and an outer peripheral packing ring 34 engaged with the inner wall of the shock cylinder as shown. The piston rod extends through the cylinder wall 30 and has an intermediate integral boss 35 sealed to the cylinder wall by a piston ring 36.

The chamber 37 of the shock cylinder adjacent the head or between the head and the wall is filled with nitrogen to form a pneumatic spring, and the annular chamber 38 between the intermediate wall 30 and the end bearing assembly 31 is filled with oil. The piston rod assembly has a small passage 39 leading from a charging valve 40 adjacent its outer end to the inner end face through which the nitrogen or other gas for the pneumatic spring is supplied to chamber 37 at the desired pressure.

The piston rod is provided also with a damping valve assembly in an inner cavity which extends internally to both sides of the piston ring carrying boss 35. This valve assembly, which may be of any available design suitable for the operation to be described, serves to control the flow of oil from one side of the thus sealed piston section to the other as the piston rod moves and thereby slows down the action of shock loads on the piston. The valve shown comprises a body 41 with a central chamber divided by an intermediate annular wall 42. At one end the chamber is in communication with the cylinder oil chamber 38 through radial passages 43 and a peripheral groove 44 in the enclosing wall of the body and a series of radial passages 45 in the next surrounding wall of the piston adjacent the relatively inner side of the piston ring formation. Communication is provided in comparable manner between the other end of the valve chamber and the cylinder oil chamber at the other side of the piston ring formation by passages 46, groove 47 and further piston rod passages 48. The flow of the oil through the valve is controlled by a spool having a central disc portion 49 engaging the chamber dividing wall 42. The spool carries free floating pins 50 in axial passages from the respective ends and the stems of plungers 51 in further cavities in the end portions of the body 41 extend into the same passages as shown. In these further cavities, coil springs 52 are placed about the plunger stems between the heads and washers 53 respectively bearing against the spool ends, the spool body having lateral apertures 54 at which the axial passages terminate. These cavities are connected by passage sections (not shown) to passage 39 and hence between the charging port and the chamber 37. Since the ends of the spool are pressure balanced to the level of the air spring, the pins 50 serving as slave pistons provide a pressure area to give motion against the spring force to the spool proportional to the shock pressure times the pin area.

The disc portion 49 of the spool is provided with a series of angular reliefs between its edges at the relatively inner side as shown at 55 and a second series of reversely angled reliefs 56 at the other outer side. It will accordingly be evident that the oil or hydraulic fluid can flow, for example, from the left side of the piston ring formation in the illustrated condition of the assembly to the valve chamber at the inner side of the disc 49 and the application of predetermined hydraulic pressure to the latter will cause the spool to move to the right against the opposing spring 52, with the reliefs 55 upon such movement providing openings for the oil to flow from the first such side of the disc to the other and from the valve chamber at the latter outwardly to the annular chamber of the cylinder about the piston rod at the other side of the piston ring formation. Exactly the same valving will be available for flow of the oil in controlled manner from the other or right side to the left side, through the employment of the reliefs 56 in the same fashion and against the other spring 52 in this instance.

The shock absorber 15 will thus be seen to provide positive damping for shock and rebound loads through the action of the valve assembly as an internal dashpot, the resulting pressure and energy dissipation serving to control the movement. The pins not only guide the spool, but also provide for positive stopping in both directions of the movement thereof. The assembly of the nitrogen, piston rod and oil forming the air over oil spring provides the main support, the basic configuration being that of a pressurized volume of air trapped by shock absorber fluid which is pressurized at the same value. Under static conditions this pressure acts on the effective area of the piston rod and the resulting force must be equal to the applied static load. When the load is increased, the internal pressure must also increase, the air is compressed further and the piston compresses to a new equilibrium position thereby providing spring travel proportional to the load. When the load is reduced, the internal pressure must decrease since the effective area remains constant and the air expands extending the piston rod and providing spring travel in the extension direction.

Figure 2:
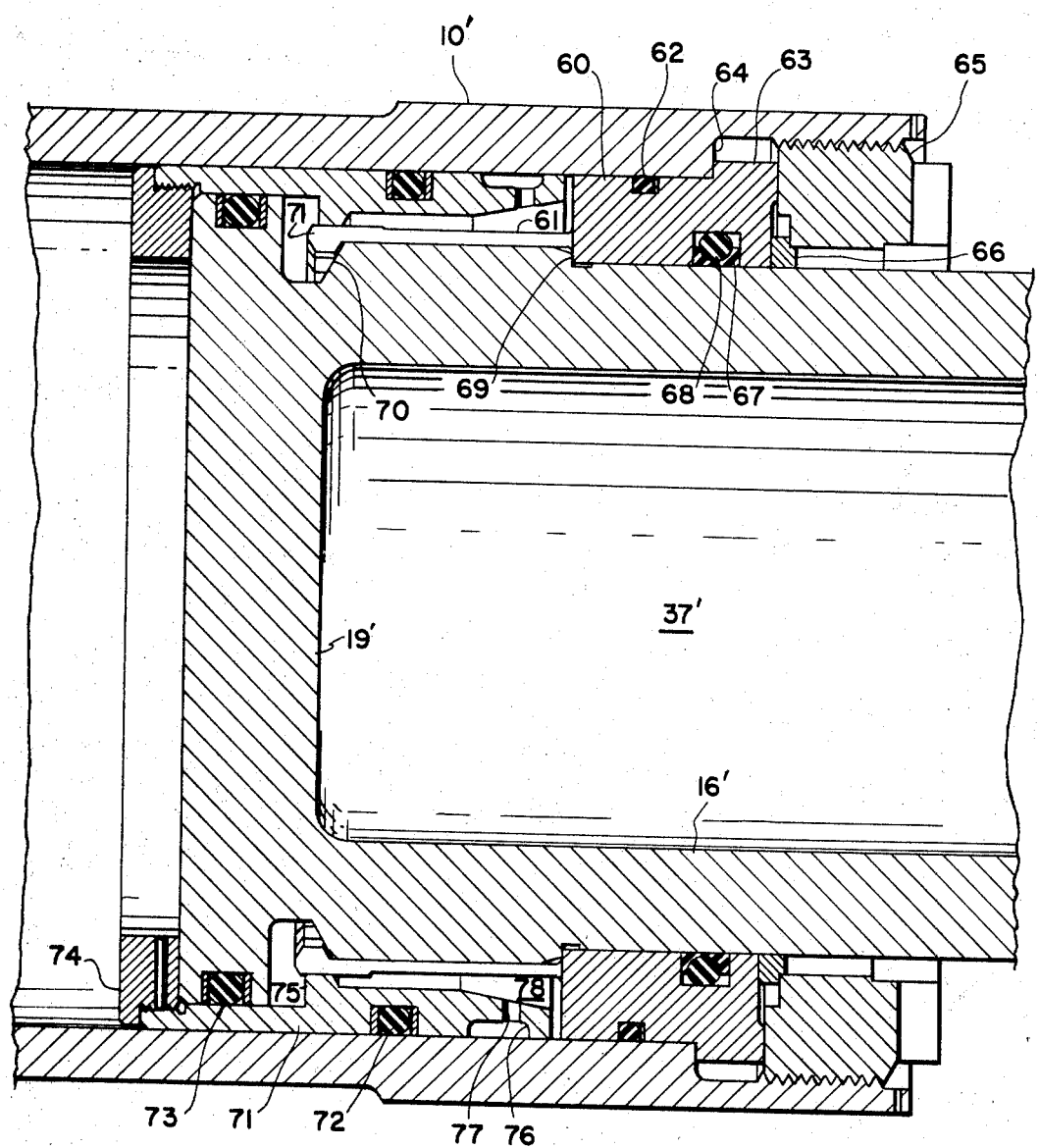
FIG. 2 shows a portion of the suspension in fragmented longitudinal section and on an enlarged scale.

A more complete illustration of the mechanical locking mechanism employed for the automatic locking of the shock absorber section when fully extended in provided by FIG. 2 in which the primed numerals indicate components already described and referenced by corresponding numerals. The finger lock is here shown as having a body 60 from which the fingers 61 extend parallel to the axis and normally spaced inwardly of the wall of the retraction cylinder 10'. The lock body 60 fits within the end of the retraction cylinder and is sealed therewith by a preformed packing 62 in a body groove. This body has an outer enlarged end 63 which abuts a shoulder 64 in the cylinder wall and it is held in place by an externally threaded lock finger ring 65. A scraper ring 66 is interposed between the ring 65 and the lock finger body 60 as shown for engagement with the outer wall surface of the shock cylinder 16' and the lock body is sealed to the latter by a channel seal 67 and preformed packing ring 68 in an inner face annular groove of such body.

The shock cylinder has an enlargement forming a shoulder 69 which abuts the finger lock body 60 in the extended condition shown and an inwardly spaced conical shoulder 70 for engagement with the heads 71 of the locking fingers, these again being beveled and the inner bevels together forming a conical surface for register with the correspondingly conical shoulder 70 on the shock cylinder.

The head 19' of the shock cylinder is again enclosed by a sleeve 71 serving as a finger lock retainer, with this sleeve carrying a preformed packing 72 with back up rings in an outer peripheral groove for engaging the retraction cylinder wall and being internally engaged at an axially spaced section of its inner wall by a preformed packing and backing ring assembly 73 carried in an outer peripheral groove of the head 19'. An externally threaded cylinder head retainer ring 74 is carried by the inner end of the lock retainer sleeve 71, and the latter has an inner intermediate flange 75 for the restraining engagement with the locking fingers about the outer surfaces of the latter.

As in the description of the FIG. 1 embodiment, the shock cylinder 16' is shown in FIG. 2 in the fully extended and hence automatically mechanically locked position, the lock being realized by the engagement of the heads 71 of the fingers 61 between the lock retainer sleeve at its flange 75 and the shock cylinder at the inclined surface 70 thereof. Also as previously described, the unlocking is accomplished by hydraulic fluid which is supplied in this case through an annular outer groove 76 in the lock retainer sleeve and a plurality of radial passages 77 to the void or clear space 78 between the inner surfaces of this ring and the lock fingers. The fluid is thus applied through a retract port which is not apparent in this illustration but provides the same hydraulic operation as described in the foregoing.

The new suspension thus is characterized by a shock absorber section having two conditions of adjustment between which it is moved by hydraulic actuation, but with a mechanical lock in one such condition here described as the relatively extended condition. A complete hydraulic system for the actuator can include a flow limiter to control the rate of retraction and the actuator will be retained in the retracted condition by hydraulic locking fluid in the outer or piston rod end of the retraction cylinder.

Other modes of applying the principle of the invention may be employed, change being made as regards the details described, provided the features stated in any of the following claim or the equivalent of such be employed.

I, therefore, particularly point out and distinctly claim as my invention:

1. A suspension comprising a shock absorber including a shock cylinder and a piston rod assembly which is relatively reciprocable therein, the rod assembly projecting from the shock cylinder for connection of its outer end to a wheel assembly and the like and having an annular enlargement intermediate its ends which is in sealed engagement with the wall of the shock cylinder, said rod assembly and annular enlargement defining an annular chamber with said shock cylinder wall, oil within said chamber, the inner end of the shock cylinder being closed by a head, the rod assembly inwardly of the sealed enlargement of the latter having an end portion spaced from said head and forming a variable volume chamber containing air, the rod assembly being formed with an internal bypass for displacement of the oil within the annular chamber from one side of the sealed enlargement to the other upon relative reciprocation of the assembly, valve means in said bypass for controlling the oil flow therethrough in both directions and providing positive damping for shock and rebound loads on the shock absorber, said valve means including oil chambers respectively communicating with the shock cylinder at the sides of the enlargement and said bypass between said chambers, a movable valving member for variably opening said bypass in both directions by movement thereof in response to oil pressure differential in the chambers, and means forming air chambers enclosing the ends of the movable member which are pressure balanced to the air of said variable volume chamber by passage means, a retraction cylinder for said shock absorber containing hydraulic fluid and having extend and retract ports respectively adjacent its ends for flow of said fluid under pressure to and from the retraction cylinder, one end of the retraction cylinder being adapted for mounting on structure to be supported by the suspension and a closure being provided for the other end, the shock cylinder of the absorber extending reciprocably with its head innermost into the retraction cylinder and being sealed to the end closure of the latter, said head having a head flange which is of smaller diameter than the inside diameter of the retraction cylinder, a sleeve about said head flange sealed thereto and to the inside diameter of the retraction cylinder, said sleeve being axially movable relative to the head flange and having inboard and outboard radial stops which project inwardly respectively at the opposite sides of said flange at a spacing appreciably greater than the axial extent of the flange for arresting engagement therewith to limit such relative sleeve movement, a mechanical lock for holding the shock cylinder in the extended condition thereof relative to the retraction cylinder including a body section which is part of the closure for the retraction cylinder through which the shock cylinder extends, said lock further inclding a plurality of spring lock fingers extending inwardly from said body section and overlying the wall of the shock cylinder, said fingers having inwardly enlarged heads at their free ends and the wall of the shock cylinder adjacent the head thereof having a cooperable relief to receive the finger heads, such wall further having a stop shoulder spaced outwardly of the relief to engage said closure and limit the extension of the shock cylinder, the heads of the lock fingers moving into the relief when the stop shoulder thus engages the closure, the outboard radial stop of the sleeve being moved over the lock finger heads in the relief when the sleeve is moved to its outermost position relative to the head flange when the shock cylinder is fully extended, thereby to mechanically lock the latter against retraction, and means for directing the pressure fluid from the retract port against the sleeve to shift it inwardly sufficiently to move the outboard stop away from the heads of the lock fingers to free the same and hence the shock absorber for hydraulic retraction into the retraction cylinder.

References Cited

UNITED STATES PATENTS

| | | | |
|---|---|---|---|
| 2,538,375 | 1/1951 | Montgomery | 188—88.505 X |
| 2,679,827 | 6/1954 | Perdue | 92—51 X |
| 2,868,482 | 1/1959 | Westcott | 244—104 X |
| 3,046,002 | 7/1962 | Schmitz. | |
| 3,054,582 | 9/1962 | Lucien | 244—102 |
| 3,216,332 | 11/1965 | De Chambeau | 92—51 X |
| 3,290,038 | 12/1966 | Tollar | 244—104 X |
| 3,292,919 | 12/1966 | Lindley et al. | |
| 3,322,393 | 5/1967 | Neilson et al. | 244—104 X |

FOREIGN PATENTS 581,833 10/1946 Great Britain.

MARTIN P. SCHWADRON, *Primary Examiner.*

IRWIN CHARLES COHEN, *Assistant Examiner.*

U.S. Cl. X.R.

92—52; 188—96; 244—104; 267—64